United States Patent
Watanabe et al.

(10) Patent No.: US 10,646,949 B2
(45) Date of Patent: May 12, 2020

(54) SPOT WELDED JOINT AND SPOT WELDING METHOD

(71) Applicant: NIPPON STEEL & SUMITOMO METAL CORPORATION, Tokyo (JP)

(72) Inventors: Fuminori Watanabe, Tokyo (JP); Yasunobu Miyazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/032,106

(22) PCT Filed: Jan. 30, 2015

(86) PCT No.: PCT/JP2015/052690
§ 371 (c)(1),
(2) Date: Apr. 26, 2016

(87) PCT Pub. No.: WO2015/115603
PCT Pub. Date: Aug. 6, 2015

(65) Prior Publication Data
US 2016/0263694 A1    Sep. 15, 2016

(30) Foreign Application Priority Data

Jan. 31, 2014  (JP) ................. 2014-017283

(51) Int. Cl.
*B23K 11/11*   (2006.01)
*B23K 11/16*   (2006.01)
(Continued)

(52) U.S. Cl.
CPC ............... *B23K 11/11* (2013.01); *B23K 11/12* (2013.01); *B23K 11/16* (2013.01); *B23K 2101/006* (2018.08); *B23K 2103/04* (2018.08)

(58) Field of Classification Search
CPC ......... B23K 11/11; B23K 11/12; B23K 11/16; B23K 2201/006; B23K 2203/04
See application file for complete search history.

(56) References Cited

U.S. PATENT DOCUMENTS

| | | |
|---|---|---|
| 2,908,801 A | 10/1959 | Cresswell |
| 2005/0145306 A1 | 7/2005 | Statnikov |

(Continued)

FOREIGN PATENT DOCUMENTS

| | | |
|---|---|---|
| CN | 1318450 A | 10/2001 |
| CN | 1810437 A | 8/2006 |

(Continued)

OTHER PUBLICATIONS

Weld Integrity and Performance, 06593G (Chapter 1, Weld Solidification), ASM International (Year: 1997).*

(Continued)

*Primary Examiner* — Dana Ross
*Assistant Examiner* — James F Sims, III
(74) *Attorney, Agent, or Firm* — Birch, Stewart, Kolasch & Birch, LLP (57) ABSTRACT

The present invention has as its object to provide a spot welded joint and spot welding method which raise the fracture toughness of spot welded metal to raise the strength of the spot welded joint. In the present invention, there is provided a spot welding method comprising a melt zone forming step forming a melt zone by conduction and, after the melt zone forming step, a solidification step of running a current lower than the current run in the melt zone forming step so as to cause the melt zone to solidify, wherein, in the solidification step, electromagnetic vibration is applied to the melt zone, and a frequency $f_V$ of the electromagnetic vibration, a solidification speed $v_S$ when the melt zone (Continued)

solidifies, and an arm interval of dendrites $\lambda_D$ when the melt zone solidifies satisfy $0.2 \leq v_S/(\lambda_D \cdot f_V) \leq 4.0$.

1 Claim, 5 Drawing Sheets

(51) Int. Cl.
    *B23K 11/12*     (2006.01)
    *B23K 101/00*     (2006.01)
    *B23K 103/04*     (2006.01)

(56) References Cited

U.S. PATENT DOCUMENTS

| | | | |
|---|---|---|---|
| 2006/0081563 | A1 | 4/2006 | Ueda et al. |
| 2011/0008647 | A1* | 1/2011 | Azuma .................... C21D 8/04 428/659 |
| 2011/0303655 | A1 | 12/2011 | Kanai et al. |
| 2012/0141829 | A1 | 6/2012 | Oikawa et al. |
| 2013/0034384 | A1* | 2/2013 | Hiraoka ............... B23K 9/0213 403/272 |
| 2013/0312370 | A1* | 11/2013 | Mueller .................. B29C 65/02 53/467 |
| 2015/0027995 | A1* | 1/2015 | Izutani .................. B23K 9/025 219/74 |

FOREIGN PATENT DOCUMENTS

| | | |
|---|---|---|
| CN | 101628358 A | 1/2010 |
| JP | 8-20851 A | 1/1996 |
| JP | 2002-103048 A | 4/2002 |
| JP | 2005-193298 A | 7/2005 |
| JP | 2009-125801 A | 6/2009 |
| JP | 2010-59451 A | 3/2010 |
| JP | 2010-82665 A | 4/2010 |
| JP | 2010-115706 A | 5/2010 |
| JP | 2011-194411 A | 10/2011 |
| JP | 2012-187615 A | 10/2012 |
| JP | 2012-187617 A | 10/2012 |
| JP | 5043236 B2 | 10/2012 |
| WO | WO 2011/025015 A1 | 3/2011 |

OTHER PUBLICATIONS

International Search Report for PCT/JP2015/052690 dated Apr. 28, 2015.
Written Opinion of the International Searching Authority for PCT/JP2015/052690 (PCT/ISA/237) dated Apr. 28, 2015.

* cited by examiner

SPOT WELDED JOINT AND SPOT WELDING METHOD

TECHNICAL FIELD

The present invention relates to a welding method comprising superposing and spot welding tensile strength 750 to 2500 MPa high strength steel sheets used in the automobile field etc., in particular tensile strength 980 MPa or more high strength steel sheets, and a spot welded joint formed by that welding method.

BACKGROUND ART

In recent years, in the automotive field, car bodies have been reduced in weight to reduce fuel consumption and cut $CO_2$ emissions and have been improved in collision safety by use of high strength steel sheet for the car bodies and their parts. For assembly of car bodies and attachment of parts etc., spot welding is mainly being used. In spot welding of high strength steel sheets, the strength of the welded joint becomes an issue.

In a joint formed by superposing and spot welding steel sheets (below referred to as a "spot welded joint"), the tensile strength is an important characteristic. Normally, the mechanical characteristics of a spot welded joint are evaluated by the tensile shear strength (TSS) measured by applying a tensile load in the direction shearing the steel sheets and by the cross tensile strength (CTS) measured by applying a tensile load in a direction peeling apart the steel sheets. The methods of measuring the tensile shear strength and the cross tensile strength are defined in JIS Z 3136 and JIS Z 3137.

In tensile strength 270 to 600 MPa steel sheets, the CTS of the spot welded joint increases along with an increase in the steel sheet strength, so there is little chance of a problem arising relating to the joint strength. However, in tensile strength 750 MPa or more steel sheets, even if the tensile strength of the steel sheets increases, the CTS does not increase, but conversely decreases.

In general, in the case of high strength steel sheets, the concentration of stress in a weld increases due to the drop in the deformation ability. Further, due to the increase in the alloy elements, the weld is easily hardened and the fracture toughness of the weld falls. As a result, the CTS falls. For this reason, improvement of the CTS in the spot welded joint of 750 MPa or more high strength steel sheets is sought.

As the method of securing strength in a spot welded joint of high strength steel sheets, various methods have been proposed.

PLT 1 discloses a welding method which repeats idling of conduction and re-conduction while still applying a pressing force after the main conduction in spot welding, then holds that state so as to refine the structure inside the nugget and improve the breaking strength of the joint.

The "structure" in the nugget in PLT 1 means the final structures and not the solidified structures. In this method, the re-conduction eases the segregation, but the solidified structures are not refined. As a result, a sufficient fracture toughness cannot be obtained. Further, repetition of re-conduction and hold are necessary, so a long time is required for welding and the advantage of spot welding of the short welding time cannot be enjoyed.

PLT 2 discloses a method of running current for tempering after a certain time elapses from the end of the main conduction and annealing the spot welded joint (nugget part and heat affected zone) to lower the hardness.

In this method, the martensite transformation is substantially completed before the operation of running current for tempering, so a long cooling time becomes necessary and there was the problem that the advantage of spot welding of the short welding time cannot be enjoyed.

Further, as a method of securing strength in a spot welded joint of high strength steel sheets, a method of heating a weld by another heating means after welding has been proposed.

PLT 3 discloses a method of heating and tempering a weld at a high frequency after welding.

In this method, a separate step becomes required after welding and the work procedure becomes complicated. Further, a special apparatus becomes required for utilizing the high frequency.

PLT 4 discloses a method of forming a nugget by main welding, then running a current of the main welding current or more as post-conduction.

In this method, if making the post-conduction time longer, the nugget size becomes larger and, further, the nugget structure becomes the same as the structure of a usual weld.

PLT 5 discloses a method of spot tensile strength 440 MPa or more welding steel sheets comprising restricting the chemical composition of the steel sheets to $C \times P \leq 0.0025$, P: 0.015% or less, and S: 0.01% or less, welding the sheets, then heat treating the weld by 300° C.×20 minutes or so to raise the strength in the peeling direction of the joint.

In this method, the steel sheets which can be used are limited. Further, a long time is required for welding, so the productivity is low.

PLT 6 discloses a spot welded joint of high strength steel sheets (tensile strength: 750 to 1850 MPa, carbon equivalent Ceq: 0.22 to 0.55 mass %) which defines the microstructure of the outside layer region of the nugget and the average particle size and number density of carbides in the microstructure.

PLT 6 only discloses a provision relating to carbides. With just this provision, it is not possible to obtain a highly reliable joint strength.

PLT 7 discloses a spot welding method giving mechanical vibration to a scheduled welding location to refine the structure of the weld when the scheduled welding location changes from a molten state to solidified structures.

In this method, there is little propagation of mechanical vibration to the melt zone. To obtain the above effect, the apparatus becomes large in size.

CITATION LIST

Patent Literature

PLT 1. Japanese Patent Publication No. 2012-187615A
PLT 2. Japanese Patent Publication No. 2002-103048A
PLT 3. Japanese Patent Publication No. 2009-125801A
PLT 4. Japanese Patent Publication No. 2010-115706A
PLT 5. Japanese Patent Publication No. 2010-059451A
PLT 6. International Patent Publication No. 2011/025015A
PLT 7. Japanese Patent Publication No. 2011-194411A

SUMMARY OF INVENTION

Technical Problem

The present invention has as its object to provide a spot welded joint and spot welding method raising the fracture toughness of the spot welded metal and improving the spot welded joint strength.

Solution to Problem

The inventors engaged in in-depth studies on the solution to such a problem. As a result, the inventors discovered that in the process of solidification of the melt zone, if applying electromagnetic vibration of the required frequency to the melt zone, the solidified structures become more refined and the fracture toughness of the spot welded metal is remarkably improved.

The present invention was made based on this discovery and has the following as its gist.

(1) A spot welded joint comprising 375 or more crystal grains of solidified structures in a 0.5 mm×0.5 mm region of a nugget end.

(2) The spot welded joint according to (1), wherein a ratio CTS/TSS of a cross tensile strength CTS and a tensile shear strength TSS is 0.33 or more.

(3) A spot welding method comprising a melt zone forming step forming a melt zone by conduction and, after the melt zone forming step, a solidification step of running a current lower than the current run in the melt zone forming step so as to solidify the melt zone, wherein, in the solidification step, an electromagnetic vibration is applied to the melt zone, and a frequency $f_V$ of the electromagnetic vibration, a solidification speed $v_S$ when the melt zone solidifies, and an arm interval of dendrites $\lambda_D$ when the melt zone solidifies satisfy $0.2 \leq v_S/(\lambda_D \cdot f_V) \leq 4.0$.

Advantageous Effects of Invention

According to the present invention, the toughness of the spot weld can be remarkably raised, so it is possible to provide a highly reliable spot welded joint.

BRIEF DESCRIPTION OF DRAWINGS

FIG. 3A shows the mode of growth of dendrites while FIG. 3B shows the mode of split of dendrites.

FIGS. 5A and 5B are views showing a comparison of solidified structures at a nugget end of a spot welded joint formed by normal solidification and solidified structures at a nugget end of a spot welded joint formed by the present invention, where FIG. 5A shows normal solidification, while FIG. 5B shows the present invention.

FIGS. 6A and 6B are views showing a comparison of solidified structures at a nugget end of a spot welded joint formed by normal solidification and solidified structures at a nugget end of a spot welded joint formed by the present invention, where FIG. 6A shows normal solidification, while FIG. 6B shows the present invention.

DESCRIPTION OF EMBODIMENTS

First, a welding method of the present invention will be explained.

Melted Zone Forming Step

First, current is run from the two sides of the superposed steel sheets to form a melt zone for securing the necessary nugget size. Any form of conduction for forming this melt zone may be selected so long as the solidification is started. Multistage conduction is also possible. Further, the current value need not be constant. A sine wave or pulse wave is also possible.

Solidification Step

If the melt zone of the necessary melt diameter can be formed, after this, a current of a value lower than the current value maintaining the melted diameter is run and electromagnetic vibration is applied while causing the melt zone to solidify.

Figure 1:
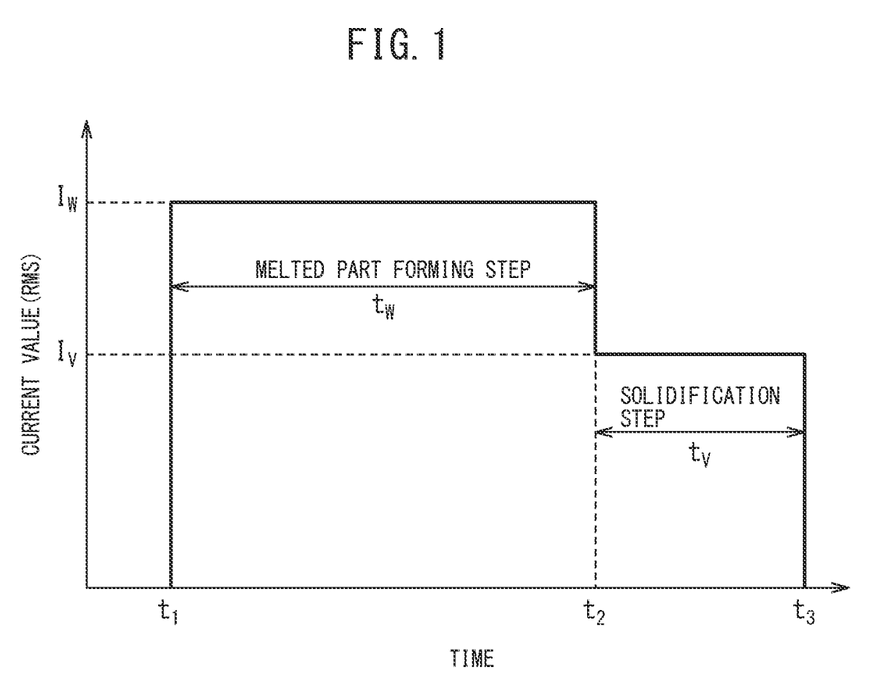
FIG. 1 is a view schematically showing a current pattern at the time of spot welding.

FIG. 1 schematically shows a current pattern at the time of spot welding in the simplest case in the welding method of the present invention. In the welding method of the present invention, the melt zone is formed by the time $t_W(=t_2-t_1)$ and current value $I_W$, then, after that, the melt zone is made to solidify while running a current $I_V$ lower than the current holding the molten diameter of the melt zone for the time $t_V(=t_3-t_2)$.

The current run at the melt zone forming step (below, referred to as the "main conduction") is not particularly limited. It may be alternating current of a commercial frequency or may be a direct current. The value of the current $I_V$ run at the solidification step is not particularly limited, but to enable solidification to proceed quickly, it has to be set lower than the current for forming the melt zone. A value of an extent satisfying $I_V^2/I_W^2 \leq 0.5$ is the rule. The current value $I_V$ does not have to be constant. However, there is no particular meaning in making the waveform a complicated one. The waveform is preferably made constant or a monotonously decreasing one.

Figure 2:
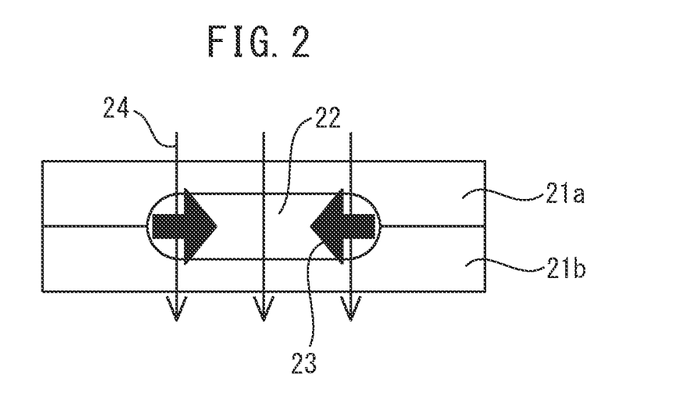
FIG. 2 is a view schematically showing a mode where a solidifying melt zone is subjected to electromagnetic vibration.

In the solidification step from the times $t_2$ to $t_3$, the solidifying melt zone is given electromagnetic vibration. FIG. 2 schematically shows the mode of application of electromagnetic vibration to the solidifying melt zone. The steel sheet 21a and the steel sheet 21b are superposed and the main conduction is performed at the current value $I_W$ for the time $t_W$ (see FIG. 1) to form the melt zone 22. At the time $t_2$ after the elapse of $t_W$, the current value is lowered to $I_V$ (see FIG. 1) and solidification of the melt zone is started.

When the melt zone solidifies, according to the normal welding method, dendrites grow from the surroundings of the melt zone toward the center of the melt zone to end solidification. In the welding method of the present invention, in the solidification process, electromagnetic vibration 24 is given to the dendrites in their growth direction 23 whereby the growth of the dendrites is split and the solidified structures of the melt zone are made finer.

Here, a "solidified structure" indicates a structure formed as a single crystal grain in the solidification process. For example, according to the solidification of dendrites, one dendrite is one unit of a solidified structure. If equiaxial solidification, one crystal grain at the time of solidification is one unit of a solidified structure.

The frequency of the electromagnetic vibration is not limited to a specific frequency so long as the dendrites can be split, but to reliably split the growth of the dendrites and make the solidified structures finer grains, it is necessary to make the frequency one where the indicator A defined by the following formula (1) satisfies the following formula (2):

$$A = v_S/(\lambda_D \cdot f_V) \tag{1}$$

$f_V$: frequency of electromagnetic vibration
$v_S$: solidification speed (speed of advance of solidification interface)
$\lambda_D$: arm interval of dendrites $$0.2 \leq A \leq 4.0 \quad (2)$$

The solidification speed and the arm interval of the dendrites are obtained by advance experiments. That is, steel sheets of the type to be actually welded are spot welded in advance by the value of current run in the weld zone forming step and solidification step, then the solidification speed and arm interval of the dendrites are measured. After measurement once, when spot welding the same type of steel sheets under the same conditions, the same values may be used. The more specific procedure will be explained below.

First, the combination of sheets and the type of steel are determined and the conditions of the main conduction are determined. Next, the current value in the solidification step is determined. This current value is, as explained above, not particularly limited.

Next, the solidification speed is measured. The combination of sheets and type of steel to be actually welded are used to prepare samples at the determined current value at the solidification step at a plurality of levels of time of running current. The solidified structures of the cross-sections of the samples are examined and the arm intervals of the dendrites are found. Further, the position where the solidified structures change from columnar crystals to equiaxed crystals or the position where the thicknesses of the columnar crystals change is the solid-liquid interface position at the time of stopping the current, so the solidification speed is found by calculation.

For example, if running current for 25 msec after the main conduction and the solidified structure changes at the cross-section at a position 0.5 mm from the melt boundary, the solidification speed is found as 20 mm/sec.

The solidification speed depends on the welding conditions, the combination of the steel sheets, the dimensions of the welded members, etc., but is about $(10 \text{ to } 50) \times 10^{-3}$ m/sec. The arm interval of the dendrites depends on the welding conditions, the combination of the steel sheets, the dimensions of the welded members, the heat input by electromagnetic vibration, etc., but is about 5 to $30 \times 10^{-6}$ m.

The frequency $f_V$ of the electromagnetic vibration becomes two times the power supply frequency. For example, if running an AC current with a frequency of 500 to 1000 Hz, the frequency $f_V$ of the electromagnetic vibration becomes 1000 to 2000 Hz (=(500 to 1000 Hz)×2).

For example, if the solidification speed is $20 \times 10^{-3}$ m/sec, if running a frequency 500 to 1000 Hz AC current, the period Tv (=1/$f_V$) at which electromagnetic vibration occurs once becomes $(0.5 \text{ to } 1.0) \times 10^{-3}$ sec. Each time electromagnetic vibration is applied, the solidification interface proceeds (10 to 20)×$10^{-6}$ m. That is, disturbance in solidification due to electromagnetic vibration occurs at a position substantially equal to the arm interval of the dendrites. As a result, the solidified structures become equiaxed crystal shaped solidified structures.

Figure 3:
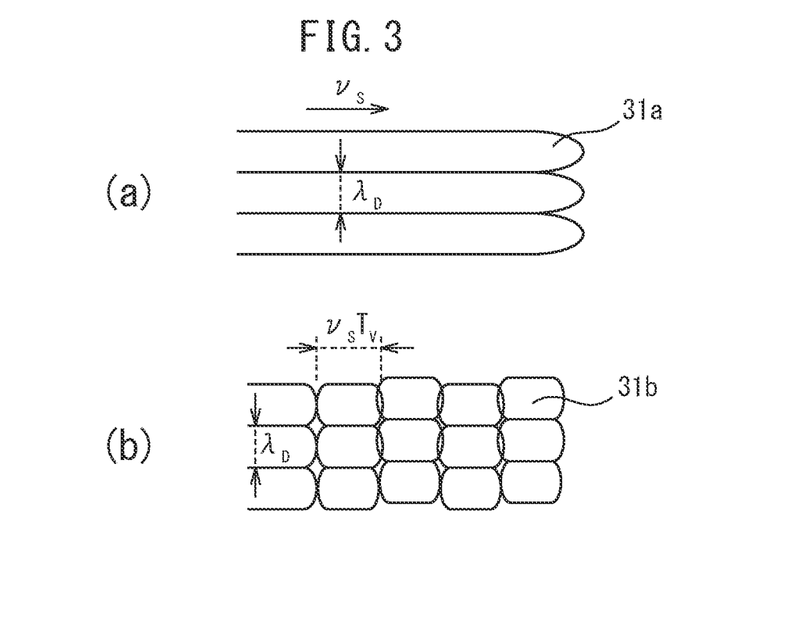
FIGS. 3A and 3B are views schematically showing modes of growth and split of dendrites, where

FIGS. 3A and 3B schematically show the modes of growth and split of dendrites. FIG. 3A shows the mode of growth of dendrites, while FIG. 3B shows the mode of split of dendrites.

In a usual method, as shown in FIG. 3A, the dendrites 31a grow by a solidification speed $v_S$ while maintaining the arm interval $\lambda_D$ then the melt zone finishes solidifying.

In the present invention, in the solidification process where dendrites are formed, the progress of solidification is disturbed by the electromagnetic vibration and the heat generated by conduction at the time of the electromagnetic vibration, the growth of dendrites is split, and equiaxed crystal shaped solidified structures such as shown in FIG. 3B are obtained.

If applying electromagnetic vibration of the frequency $f_V$ satisfying the formula (2) to dendrites grown by a dendrite arm interval $\lambda_D$ and solidification speed $v_S$, due to the electromagnetic vibration and the heat generated by conduction at the time of electromagnetic vibration inside of the melt zone in the solidification process, disturbances in solidification in the solidification process occur at intervals of positions of $v_S \cdot T_V$ where the period of the electromagnetic vibration is $T_V$ (=1/$f_V$).

In the solidification step, due to the periodic disturbances in the melt zone, as shown in FIG. 3B, the dendrite growth is split resulting in fine grains 31b and the solidified structures of the melt zone can be made equiaxed crystal shaped solidified structures.

An indicator A defined in the present invention is an indicator showing the extent of split of the dendrites. If the indicator A satisfies the formula (2), the desired solidified structures can be obtained in the melt zone.

When the indicator A is "1", the solidified structures become equiaxed crystal structures comprised of dendrites of arm intervals $\lambda_D$ split at the arm intervals $\lambda_D$ whereby the fracture toughness is improved. However, in the present invention, the toughness of the welded joint may be improved due to the refinement of the solidified structures, so the indicator A does not necessarily have to be made 1.

From the viewpoint of refinement, the indicator A is preferably smaller. However, it is necessary to make the indicator A less than 0.2 without raising the current value for electromagnetic vibration at the time of solidification. If raising the electromagnetic vibration frequency, it is necessary to increase the frequency of conduction for electromagnetic vibration at the time of solidification. The inductance loss at the time of conduction for electromagnetic vibration becomes larger and the power supply becomes larger in capacitance. Therefore, the indicator A is made 0.2 or more. Preferably, it is 0.4 or more.

If the indicator A is over 4.0, the intervals of disturbing solidification in the solidification process become wider, the solidified structures become columnar, and the toughness improving effect is reduced. Therefore, the indicator A is made 4.0 or less. Preferably, it is 3.0 or less.

In the welded joint of the present invention formed with an indicator A of 4.0 or less, in the solidified structures of at least the nugget end, the structures become not extremely long columnar structures, but equiaxed crystal shape structures (including equiaxed crystal structures).

Next, the structure of the spot welded joint of the present invention will be explained.

The spot welded joint of the present invention includes 375 or more crystal grains of solidified structures in a 0.5 mm×0.5 mm region of the nugget end. If there are 375 or more crystal grains of solidified structures at the end of the nugget where stress concentrates, the spot welded joint can be provided with a high fracture toughness.

If there are less than 375 crystal grains of solidified structures in a 0.5 mm×0.5 mm region of the nugget end, the equiaxed crystal shapes of the solidified structures are not achieved, the effect of improving the toughness of the weld metal is small, and the strength of the welded joint is improved. The preferable number of crystal grains is 500 or more.

In metals to which no large strain is imparted after finishing solidifying, the elements which easily concentrate at the liquid phase concentrate at the time of solidification and remain at that concentration after solidification. For this reason, if the distribution of concentration of elements is examined, it can be confirmed that one thin mass of the concentrated elements corresponds to one unit of a solidified structure. In metals such as ferrous metals where transformation occurs in the solid phase after solidification, a unit of a crystal grain of a final structure and a unit of a solidified structure are separate.

As the method of observation of the solidified structures, for example, there is the method of etching by picric acid and observation of the structures by an optical microscope. If etching by picric acid, parts where segregation elements (in particular P) concentrate are preferentially corroded. Further, P is an element segregating at the time of solidification. Therefore, the distribution of concentration of the segregation elements at the time of solidification can be learned, so the solidified structures can be observed.

As another method, there is the method using EPMA. According to EPMA, the distribution of elements can be measured, so the solidified structures can be observed.

Note that, as the method of observing the final structures, for example, observation of the structures by Nital etching or measurement by EBSD may be mentioned.

Figure 4:
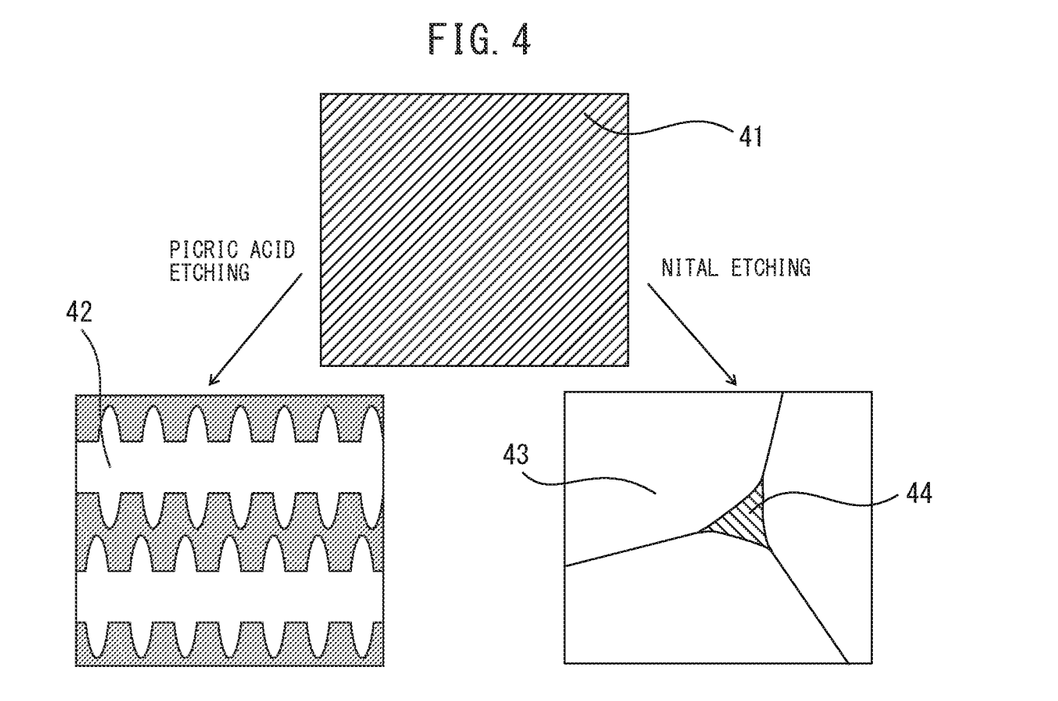
FIG. 4 is a view showing the concept of observation of solidified structures and final structures.

FIG. 4 is a view showing the concept of observation of the solidified structures and final structures. As shown in FIG. 4, even with the same metal 41, the observed structures will differ depending on the method of etching.

Figure 5:
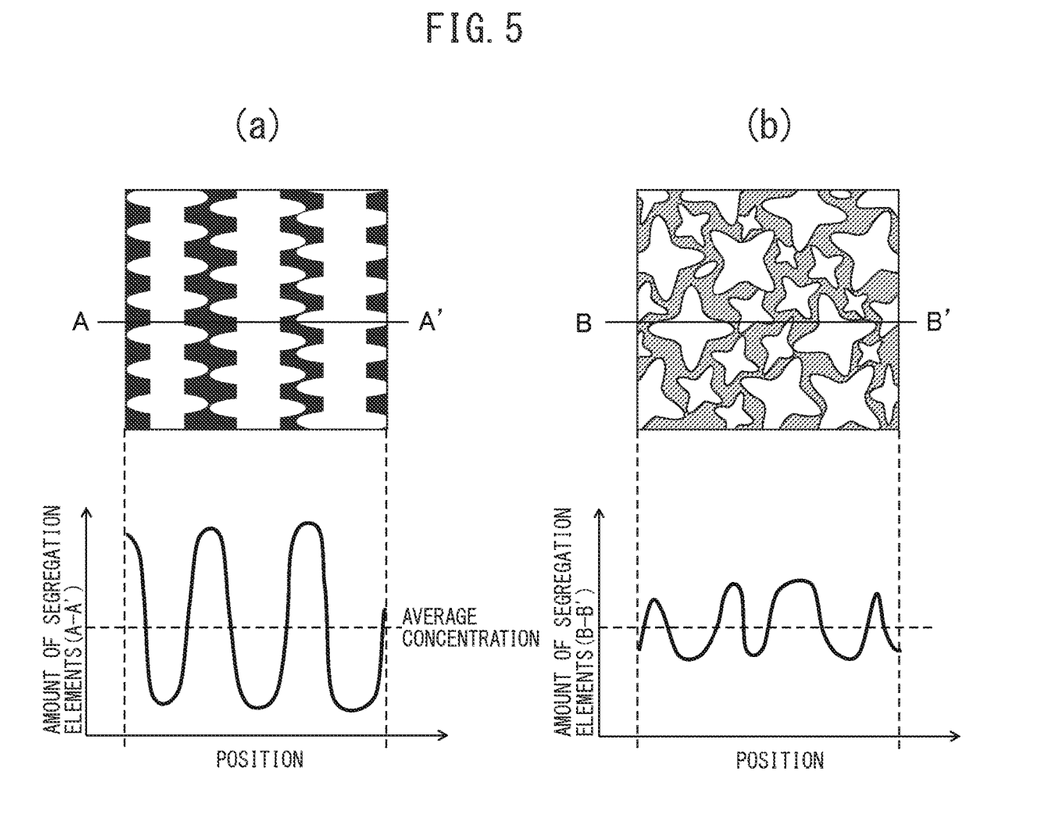

FIGS. 5A and 5B compare the solidified structures at the nugget end of a spot welded joint formed by normal solidification and the solidified structures at the nugget end of a spot welded joint formed by the present invention, where FIG. 5A shows normal solidification, while FIG. 5B shows the present invention. FIG. 5A shows that dendrites are formed and segregation becomes strong, while FIG. 5B shows the structures are refined and segregation becomes weaker.

Figure 6:
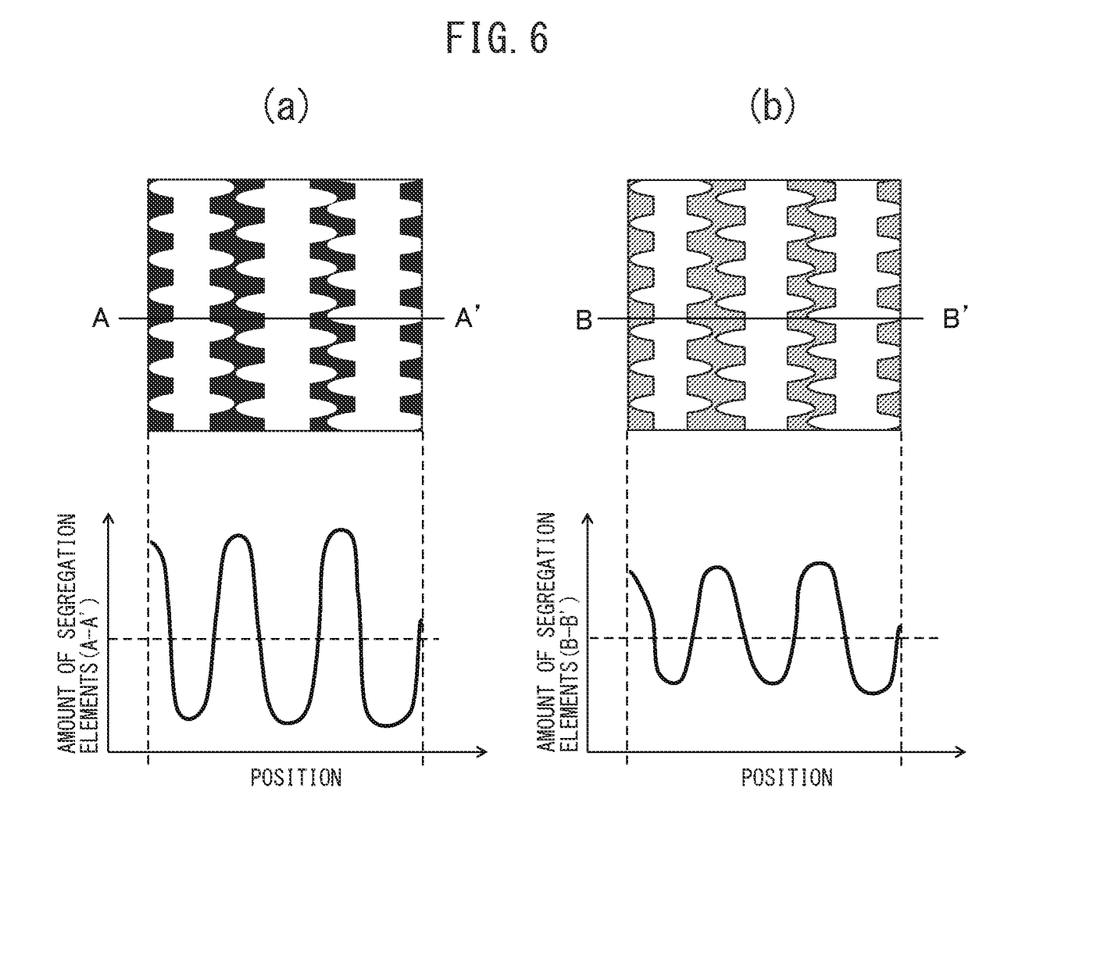

FIGS. 6A and 6B are views showing the solidified structures at the nugget end of a spot welded joint formed by normal solidification and the solidified structures after post-conduction after solidification, where FIG. 6A shows the structures after solidification, while FIG. 6B shows the structures after post-conduction. Due to the post conduction, the solidification segregation is eased, but the solidified structures (dendrites) themselves formed at the time of solidification are never refined.

Figure 7:
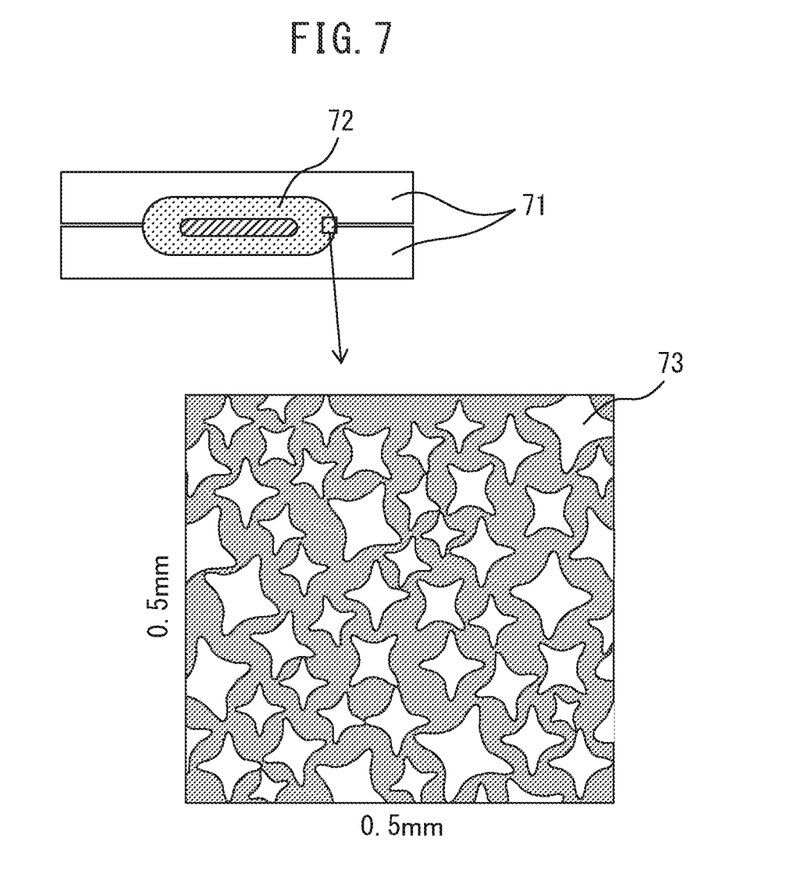
FIG. 7 is a view explaining observation of solidified structures in the present invention.

FIG. 7 is a view explaining the observation of the solidified structures in the present invention. By Nital etching for observing the solidified structures, the solidified structures are exposed and the number of solidified structures at the nugget end is counted. In the present invention, if even part of a solidified structure is included in the 0.5 mm×0.5 mm region, it is counted as one.

The present invention welded joint is improved in fracture toughness of the weld metal and improved in the mechanical properties of the joint, in particular the joint strength, by making the number of crystal grains of the solidified structures in a 0.5 mm×0.5 mm region of a nugget end 375 or more.

In the joint strength, the cross tensile strength CTS and the tensile shear strength TSS are important indicators. However, to secure the quality of a spot welded joint, it is necessary that just the TSS be high. The CTS may not be lowered. The reason is that a structure is subjected to a complex load, so if the CTS is lower than the TSS, the weld will fracture due to a slight peeling load. For this reason, to objectively evaluate the mechanical properties of the weld, the indicator Z defined by the following formula (4) was employed.

$$Z = CTS/TSS \quad (4)$$

CTS: cross tensile strength

TSS: tensile shear strength

The welded joint depends on the sheet thickness or the size of the weld metal, but with the indicator Z, the TSS and the CTS respectively include the effects of the sheet thickness and size of the weld metal, so the indicator Z is suitable as an indicator for evaluating the properties of the weld metal itself.

If Z is less than 0.33, the difference in the yield strength in the load direction to the joint is too large and the properties of the members become unstable. That is, the joint breaks by just a slight peeling load. Therefore, Z is preferably 0.33 or more. It is more preferably 0.4 or more. The upper limit of Z is not particularly set.

EXAMPLES

Next, examples of the present invention will be explained. The conditions in the examples are an illustration of conditions employed for confirming the workability and effects of the present invention. The present invention is not limited to this illustration of conditions. The present invention can employ various conditions so long as not deviating from the gist of the present invention and achieving the object of the present invention.

Example 1

The steel sheets shown in Table 1 were prepared and spot welded by the combinations shown in Table 2. The welding conditions are shown together in Table 2.

TABLE 1

| No. | Type of steel sheet | Strength (MPa) | Amount of C (mass %) | Carbon equivalent | Sheet thickness (mm) |
|---|---|---|---|---|---|
| 1 | Cold rolled | 980 | 0.13 | 0.23 | 2 |
| 2 | Cold rolled | 1180 | 0.19 | 0.41 | 1.2 |
| 3 | Zinc plated | 980 | 0.13 | 0.23 | 1.6 |
| 4 | Hot stamped | 1470 | 0.22 | 0.34 | 1.6 |

Here, "carbon equivalent" is the value found by the following formula using the contents (mass %) of C, Si, Mn, P, and S.

Carbon equivalent=C (mass %)+Si (mass %)/30+Mn (mass %)/20+P (mass %)×4+S (mass %)×4

In Table 2, "A" is the value found by $A = v_S/(\lambda_D \cdot f_V)$ where the frequency of the electromagnetic vibration in the solidification step is $f_V$, the solidification speed is $v_S$, and the arm interval of dendrites is $\lambda_D$. For the solidification speed and arm interval of dendrites, the values experimentally found in advance as explained above using the combination of sheets and types of steel used were used.

TABLE 2

| No. | Combination of steel types | Pressing force (kN) | Melted zone forming step | | | Solidification step | | | A | Nugget size (mm) |
|---|---|---|---|---|---|---|---|---|---|---|
| | | | Current value $I_w$ (kA) | Conduction time $t_w$ (ms) | Conduction frequency (Hz) | Current value $I_v$ (kA) | Conduction time $t_v$ (ms) | Conduction frequency (Hz) | | |
| 1 | 1-1 | 5.0 | 7.0 | 400 | 100 | 4.0 | 100 | 600 | 1.5 | 5.7 |
| 2 | 2-2 | 3.0 | 5.4 | 240 | 100 | 3.1 | 60 | 400 | 1.8 | 5.5 |
| 3 | 3-3 | 4.0 | 7.2 | 320 | 100 | 4.7 | 100 | 950 | 1.2 | 5.1 |
| 4 | 4-4 | 4.0 | 6.6 | 320 | 100 | 3.2 | 80 | 800 | 0.9 | 6.3 |
| 5 | 4-4 | 4.0 | 6.6 | 320 | 100 | 3.2 | 80 | 400 | 1.9 | 6.3 |
| 6 | 4-4 | 4.0 | 6.6 | 320 | 100 | 3.2 | 80 | 270 | 3.1 | 6.3 |
| 7 | 4-4 | 4.0 | 6.6 | 320 | 100 | 3.2 | 80 | 200 | 3.9 | 6.3 |
| 8 | 2-2 | 3.0 | 5.4 | 240 | 100 | — | — | — | — | 5.5 |
| 9 | 4-4 | 4.0 | 6.6 | 320 | 100 | — | — | — | — | 6.3 |
| 10 | 4-4 | 4.0 | 6.6 | 320 | 100 | 3.2 | 80 | 160 | 4.4 | 6.3 |
| 11 | 4-4 | 4.0 | 6.6 | 320 | 100 | 3.2 | 80 | 178 | 4.3 | 6.3 |
| 12 | 4-4 | 4.0 | 6.6 | 320 | 100 | 3.2 | 80 | 186 | 4.2 | 6.3 |
| 13 | 4-4 | 4.0 | 6.6 | 320 | 100 | 3.2 | 80 | 195 | 4.1 | 6.3 |
| 14 | 4-4 | 4.0 | 6.6 | 320 | 100 | 4.8 | 80 | 800 | 0.2 | 6.3 |
| 15 | 4-4 | 4.0 | 6.6 | 320 | 100 | 5.6 | 80 | 800 | 0.15 | 6.3 |

The nugget end of a welded joint was etched by picric acid, the solidified structures were observed by an optical microscope, and the number of crystal grains in a 0.5 mm×0.5 mm region at the nugget end was measured. Further, the cross tensile strength CTS of the welded joint was measured in accordance with JIS Z 3137 while the tensile shear stress TSS was measured in accordance with JIS Z 3136. The results are shown in Table 3. In Table 3, "Z" is a value found by Z=CSS/TSS.

TABLE 3

| Symbol | TSS (kN) | CTS (kN) | Z | No. of solidified structures | Remarks |
|---|---|---|---|---|---|
| 1 | 21.3 | 10.9 | 0.51 | 516 | Inv. ex. |
| 2 | 15.3 | 6.1 | 0.40 | 440 | Inv. ex. |
| 3 | 14.7 | 7.2 | 0.49 | 664 | Inv. ex. |
| 4 | 20.2 | 8.4 | 0.42 | 458 | Inv. ex. |
| 5 | 19.6 | 7.8 | 0.39 | 442 | Inv. ex. |
| 6 | 19.7 | 7.6 | 0.38 | 397 | Inv. ex. |
| 7 | 19.4 | 6.8 | 0.35 | 381 | Inv. ex. |
| 8 | 14.9 | 4.7 | 0.31 | 198 | Comp. ex. |
| 9 | 18.3 | 4.8 | 0.26 | 227 | Comp. ex. |
| 10 | 18.6 | 5.2 | 0.28 | 294 | Comp. ex. |
| 11 | 18.8 | 5.4 | 0.29 | 311 | Comp. ex. |
| 12 | 18.7 | 5.7 | 0.30 | 325 | Comp. ex. |
| 13 | 19.1 | 6.2 | 0.32 | 352 | Comp. ex. |
| 14 | 17.2 | 6.4 | 0.37 | 411 | Inv. ex. |
| 15 | 16.3 | 3.8 | 0.23 | 227 | Comp. ex. |

INDUSTRIAL APPLICABILITY

As explained above, according to the present invention, it is possible to remarkably raise the strength of a spot welded joint, so it is possible to provide a highly reliable spot welded joint. Accordingly, the present invention has a high applicability in industries using welding for assembling structures, for example, the auto industry.

REFERENCE SIGNS LIST 21a, 21b. steel sheets
22. melt zone
23. growth direction of dendrite
24. electromagnetic vibration
31a. dendrite
31b. fine grain
41. metal
42. dendrite
43. phase 1
44. phase 2
71. steel sheet
72. nugget
73. solidified structure

The invention claimed is:

1. A spot welding method comprising:
   superposing at least two steel sheets;
   forming a melt zone by conduction,
   wherein the conduction is performed by running a current having a value,
   after said melt zone forming, forming a solidified structure in the melt zone running another current of which value is lower than the value for forming the melt zone, and applying an electromagnetic vibration, and
   wherein a frequency $f_V$ of the electromagnetic vibration, a solidification speed $v_S$ when the melt zone solidifies, and an arm interval of dendrites $\lambda_D$ when the melt zone solidifies satisfy $0.2 \leq v_S/(\lambda_D \cdot f_V) \leq 4.0$, and
   the solidification speed $v_S$ and the arm interval of the dendrites $\lambda_D$ are obtained by advance experiments, wherein:
   the solidification speed $v_S$ and the arm intervals of the dendrites $\lambda_D$ are obtained by applying spot welding to samples of which combination of sheet and type of steel are the same as in the steel sheets to be welded while putting time of running current under plural conditions.

* * * * *